US009754720B2

(12) United States Patent
Yao

(10) Patent No.: US 9,754,720 B2
(45) Date of Patent: Sep. 5, 2017

(54) MULTILAYER CERAMIC CAPACITOR

(71) Applicant: Murata Manufacturing Co., Ltd., Nagaokakyo-shi, Kyoto-fu (JP)

(72) Inventor: Takayuki Yao, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 36 days.

(21) Appl. No.: 14/918,817

(22) Filed: Oct. 21, 2015

(65) Prior Publication Data
US 2016/0042866 A1 Feb. 11, 2016

Related U.S. Application Data

(63) Continuation of application No. PCT/JP2014/053173, filed on Feb. 12, 2014.

(30) Foreign Application Priority Data

Apr. 25, 2013 (JP) ................. 2013-092101

(51) Int. Cl.
*H01G 4/12* (2006.01)
*H01G 4/30* (2006.01)
(Continued)

(52) U.S. Cl.
CPC ....... *H01G 4/1227* (2013.01); *C04B 35/4682* (2013.01); *H01G 4/0085* (2013.01); *H01G 4/012* (2013.01); *H01G 4/12* (2013.01); *H01G 4/248* (2013.01); *H01G 4/30* (2013.01); *C04B 2235/3206* (2013.01); *C04B 2235/3217* (2013.01); *C04B 2235/3224* (2013.01);
(Continued)

(58) Field of Classification Search
None
See application file for complete search history.

(56) References Cited

U.S. PATENT DOCUMENTS 3,760,244 A 9/1973 McClelland, Jr.
6,270,906 B1 8/2001 Nakamura et al.
(Continued)

FOREIGN PATENT DOCUMENTS

JP H11-251173 A 9/1999
JP 2002-270458 A 9/2002
(Continued)

OTHER PUBLICATIONS

International Search Report issued for PCT/JP2014/053173, date of mailing Apr. 15, 2014.
(Continued)

*Primary Examiner* — Dion R Ferguson
(74) *Attorney, Agent, or Firm* — Arent Fox LLP

(57) ABSTRACT

A multilayer ceramic capacitor that has alternately stacked dielectric layers containing, as their main constituent, a barium titanate based compound that has a perovskite-type crystal structure; and internal electrode layers with electrode defects. The internal electrode layers are 0.6 μm or less in thickness. The electrode defects have electrode defects containing an Al—Si based oxide mainly containing Al and Si. The number of the electrode defects containing the Al—Si based oxide is 30% or more in number ratio to the total number of electrode defects in the internal electrodes.

11 Claims, 6 Drawing Sheets

(51) Int. Cl.
*H01G 4/008* (2006.01)
*H01G 4/012* (2006.01)
*C04B 35/468* (2006.01)
*H01G 4/248* (2006.01)

(52) U.S. Cl.
CPC ............ *C04B 2235/3236* (2013.01); *C04B 2235/3239* (2013.01); *C04B 2235/3244* (2013.01); *C04B 2235/3267* (2013.01); *C04B 2235/3418* (2013.01); *C04B 2235/5445* (2013.01); *C04B 2235/6584* (2013.01); *C04B 2235/661* (2013.01)

(56) References Cited

U.S. PATENT DOCUMENTS

2004/0179326 A1* 9/2004 Hattori .................. H01G 4/008
 361/320
2005/0219794 A1* 10/2005 Iguchi ................. C04B 35/4682
 361/321.2
2011/0038097 A1 2/2011 Matsuda et al.
2012/0033344 A1 2/2012 Nakamura

FOREIGN PATENT DOCUMENTS

| | | |
|---|---|---|
| JP | 2004-111698 A | 4/2004 |
| JP | 2004-111698 A | 4/2004 |
| JP | 2004-273975 A | 9/2004 |
| JP | 2008-085041 A | 4/2008 |
| JP | 2008-162818 A | 7/2008 |
| JP | 2012-036021 A | 2/2012 |
| WO | WO 2010/013414 A1 | 2/2010 |

OTHER PUBLICATIONS

Written Opinion of the International Searching Authority issued for PCT/JP2014/053173, date of mailing Apr. 15, 2014.

* cited by examiner

MULTILAYER CERAMIC CAPACITOR

CROSS REFERENCE TO RELATED APPLICATIONS

The present application is a continuation of International application No. PCT/JP2014/053173, filed Feb. 12, 2014, which claims priority to Japanese Patent Application No. 2013-092101, filed Apr. 25, 2013, the entire contents of each of which are incorporated herein by reference.

FIELD OF THE INVENTION

The present invention relates to a multilayer ceramic capacitor, and more particularly, to a high-dielectric-constant multilayer ceramic capacitor containing a barium titanate based compound as its main constituent.

BACKGROUND OF THE INVENTION

As ceramic materials for use in multilayer ceramic capacitors, conventionally, barium titanate based compounds which have a high dielectric constant have been widely known.

In addition, this type of multilayer ceramic capacitor has a ceramic sintered body obtained by alternately staking dielectric layers composed of a dielectric ceramic and internal electrode layers and applying a firing treatment, and has external electrodes formed on both ends of the ceramic sintered body.

Further, with the development of electronics technology in recent years, the reduction in size and the increase in capacitance have been rapidly progressed for multilayer ceramic capacitors, and accordingly, dielectric layers and internal electrode layers have been also reduced in thickness, and increased in the number of layers.

However, when the dielectric layers and the internal electrode layers are reduced in thickness and increased in the number of layers as just described above, the coverage of the internal electrode layers on the dielectric layers is decreased due to deformations during stacking, the difference in shrinkage behavior during firing, etc., thereby generating electrode defects in the internal electrode layers, and for this reason, there is a possibility of causing a decrease in electrostatic capacitance or a variation in electrostatic capacitance.

Therefore, for example, Patent Document 1 proposes a multilayer ceramic capacitor including external electrodes on end surfaces of a capacitor main body of alternately laminated dielectric layers containing barium titanate as their main constituent and internal electrode layers containing Ni as its main constituent, where the number of vacancies per unit area of periphery in the internal electrode layers is smaller than the number of vacancies per unit area of the central part excluding the periphery.

In Patent Document 1, the number of vacancies per unit area at the periphery of the internal electrode layers excluding connecting ends thereof to the external electrodes is made smaller than the number of vacancies per unit area of the central part excluding the periphery of the internal electrode layers, thereby reducing defects around the internal electrode layers, and thus trying to keep a decrease or variation in electrostatic capacitance from being caused, even when the dielectric layers and internal electrodes are reduced in thickness and increased in the number of layers.

Patent Document 1: Japanese Patent Application Laid-Open No. 2008-85041 (claim 1, paragraph numbers [0009], [0045] to [0052], etc.)

SUMMARY OF THE INVENTION

Now, when the dielectric layers are reduced in thickness, the electric field applied to the dielectric layers is increased, and it is thus important to ensure favorable reliability.

However, in Patent Document 1, there is a possibility that ingress of moisture will be caused from the outside to the interfaces between the dielectric layers and the internal electrode layers to cause the moisture to flow into the vacancies, because the vacancies are formed in the internal electrode layers. Further, due to the fact that the barium component in the barium titanate contained in the dielectric layers is likely to be eluted into moisture, when a high electric field is applied continuously for a long period of time in hot and humid conditions, there is a possibility of making failures more likely to occur, thereby resulting in failure to ensure sufficient reliability.

The present invention has been achieved in view of these circumstances, and an object of the invention is to provide a multilayer ceramic capacitor which can ensure favorable reliability even when a high electric field is applied continuously for a long period of time in hot and humid conditions, with dielectric layers and internal electrode layers reduced in thickness and increased in number.

In order to achieve the object mentioned above, the inventor has conducted earnest research with the use of barium titanate based compounds for ceramic materials to come up with a finding that even when electrode defects are generated in internal electrode layers, as long as the internal electrode layers are 0.6 µm or less, moisture ingress from the outside into the electrode defects can be suppressed by causing the electrode defects to contain an Al—Si based oxide mainly containing Al and Si, and making the number of the electrode defects containing the Al—Si based oxide 30% or more in number ratio to the total number of the electrode defects, and as a result, even when a high electric field is applied continuously for a long period of time in hot and humid conditions, failure occurrences can be suppressed, and a multilayer ceramic capacitor with desired high reliability can be achieved.

The present invention has been achieved on the basis of this finding, and the multilayer ceramic capacitor according to the present invention is a multilayer ceramic capacitor including a laminated body obtained by alternately laminating dielectric layers and internal electrode layers, characterized in that the dielectric layers contain, as their main constituent, a barium titanate based compound that has a perovskite-type crystal structure, there are electrode defects in the internal electrode layers, the internal electrode layers are formed to be 0.6 µm or less in thickness, there are electrode defects containing an Al—Si based oxide mainly containing Al and Si among the electrode defects, and the number of the electrode defects containing the Al—Si based oxide is 30% or more in number ratio to the total number of the electrode defects in the internal electrode layers.

In this regard, the electrode defect refers to a site where the internal electrode misses in the internal electrode layer, with the formation of a through hole passing through the internal electrode layer in the stacking direction.

In addition, in the multilayer ceramic capacitor according to the present invention, preferably, the laminated body contains Al and Si, and the Al content and the Si content are respectively 0.10 to 0.30 parts by mol and 1.6 to 4.0 parts by mol with respect to 100 parts by mol of Ti.

As just described above, the Al and Si contents in the predetermined ranges makes it possible to ensure further reliability improvement.

In addition, the rare-earth element Re has the effect of inhibiting the transfer of oxygen vacancies, and the laminated body containing therein the rare-earth element Re within a predetermined range thus also makes it possible to improve reliability. Furthermore, when the laminated body contains therein Mg, Mn, V, and Zr within predetermined ranges, further reliability improvement can be achieved.

More specifically, in the multilayer ceramic capacitor according to the present invention, preferably, the laminated body contains Mg, Mn, V, Zr, and the rare-earth element Re, and as for the respective contents of the Mg, Mn, V, Zr, and rare-earth element Re, the Mg, the Mn, the V, the Zr, and the rare-earth element are respectively 0.10 to 2.0 parts by mol, 0.01 to 0.30 parts by mol, 0.01 to 0.30 parts by mol, 0.20 to 0.80 parts by mol, and 0.95 to 2.0 parts by mol with respect to 100 parts by mol of Ti.

In addition, in the multilayer ceramic capacitor according to the present invention, preferably, the laminated body contains Al and Si, and the Al content and the Si content are respectively 0.10 to 0.30 parts by mol and 1.6 to 4.0 parts by mol with respect to 100 parts by mol of Ti when the laminated body is dissolved by dissolution treatment.

Furthermore, in the multilayer ceramic capacitor according to the present invention, preferably, the laminated body contains Mg, Mn, V, Zr, and the rare-earth element Re, and when the laminated body is dissolved by dissolution treatment, as for the respective contents of the Mg, Mn, V, Zr, and rare-earth element Re, the Mg, the Mn, the V, the Zr, and the rare-earth element are respectively 0.10 to 2.0 parts by mol, 0.01 to 0.30 parts by mol, 0.01 to 0.30 parts by mol, 0.20 to 0.80 parts by mol, and 0.95 to 2.0 parts by mol with respect to 100 parts by mol of Ti.

The multilayer ceramic capacitor according to the present invention is the multilayer ceramic capacitor including the laminated body obtained by alternately laminating the dielectric layers and the internal electrode layers, in which the dielectric layers contain, as their main constituent, a barium titanate based compound that has a perovskite-type crystal structure, there are electrode defects in the internal electrode layers, the internal electrode layers are formed to be 0.6 µm or less in thickness, there are electrode defects containing an Al—Si based oxide mainly containing Al and Si among the electrode defects, and the number of the electrode defects containing the Al—Si based oxide is 30% or more in number ratio to the total number of the electrode defects in the internal electrode layers. Thus, the Al—Si based oxide present in the electrode defects exerts the effect of inhibiting moisture ingress, thereby making it possible to suppress failure occurrences even when a high electric field is applied continuously for a long period of time in hot and humid conditions, and achieve a multilayer ceramic capacitor with desired high reliability.

DETAILED DESCRIPTION OF THE INVENTION

Next, an embodiment of the present invention will be described in detail.

Figure 1:
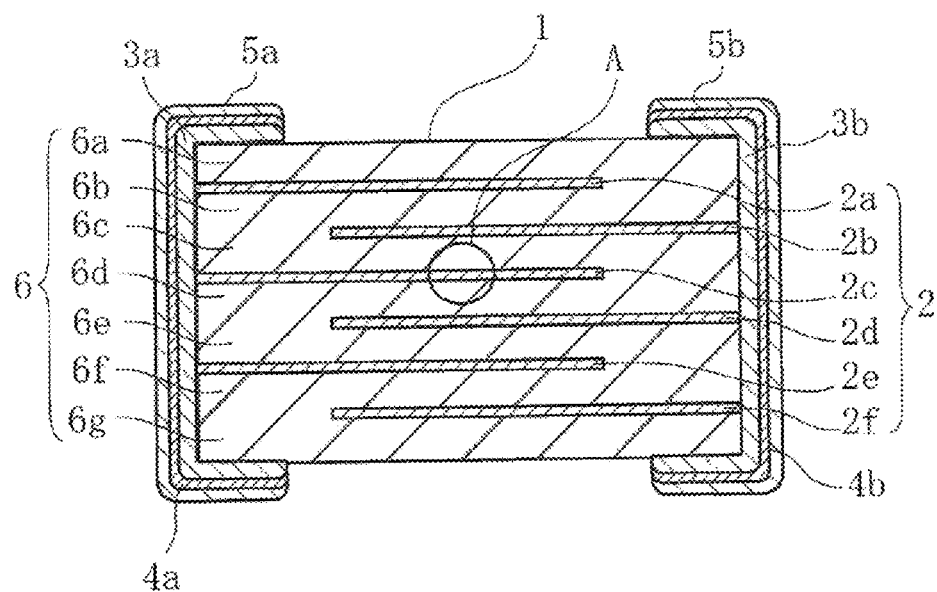
FIG. 1 is a cross-sectional view schematically illustrating an embodiment of a multilayer ceramic capacitor according to the present invention.

FIG. 1 is a cross-sectional view schematically illustrating an embodiment of a multilayer ceramic capacitor according to the present invention.

This multilayer ceramic capacitor has internal electrode layers 2 (2a to 2f) buried in a ceramic sintered body (laminated body) 1, has external electrodes 3a and 3b formed on both ends of the ceramic sintered body 1, and further has first plating films 4a and 4b and second plating films 5a and 5b formed on the surfaces of the external electrodes 3a and 3b.

More specifically, the ceramic sintered body 1 is composed of thinned dielectric layers 6 (6a to 6g) and the internal electrode layers 2 (2a to 2f) stacked alternately a number of times and subjected to firing, and the internal electrode layers 2a, 2c, and 2e are electrically connected the external electrode 3a, whereas the internal electrode layers 2b, 2d, and 2f are electrically connected the external electrode 3b. Furthermore, electrostatic capacitance is formed between the opposed surfaces of the internal electrode layers 2a, 2c, and 2e and of the internal electrode layers 2b, 2d, and 2f.

The dielectric layers 6 (6a to 6g) contain, as their main constituent, a barium titanate-based compound.

The barium titanate-based compound, which has a perovskite-type crystal structure represented by the general formula $ABO_3$, are widely used in the application of high-dielectric-constant multilayer ceramic capacitors, because of the high relative permittivity of the compound.

Specific forms of the barium titanate based compound can include $BaTiO_3$ with the A site substituted with Ba and the B site substituted with Ti; $(Ba, Ca)TiO_3$, $(Ba, Sr)TiO_3$, or $(Ba, Ca, Sr)TiO_3$ with some of the Ba substituted with at least one element of Ca and Sr; $Ba(Ti, Zr)O_3$, $Ba(Ti, Hf)O_3$, or $Ba(Ti, Zr, Hf)O_3$ with some of the Ti substituted with at least one element of Zr and Hf; or combinations thereof.

In addition, while the compounding molar ratio between the A site and the B site is supposed to be 1.000 stoichiometrically, the compound is also preferably provided so that the A site or the B site is excessive, if necessary, to such an extent that has no effect on the various properties or characteristics, sinterability, etc.

In addition, while the internal electrode material constituting the internal electrode layers 2 (2a to 2f) is not to be considered particularly limited, a material is preferably used which contains an inexpensive and highly conductive Ni as its main constituent.

Figure 2:
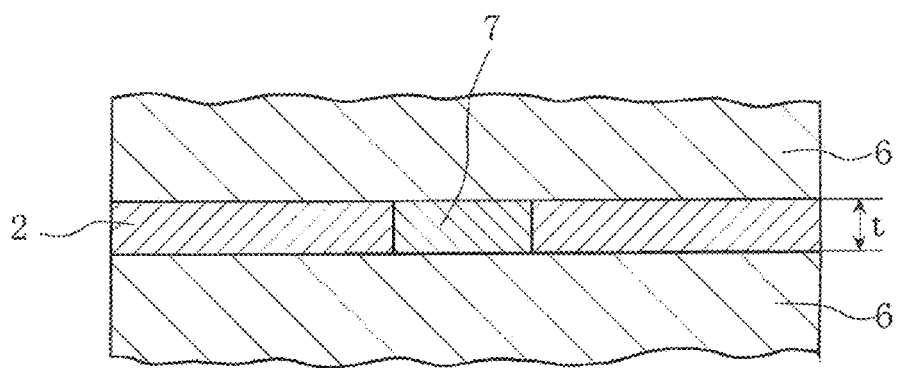
FIG. 2 is an enlarged cross-sectional view of a main part in FIG. 1.

FIG. 2 is an enlarged cross-sectional view of a part A in FIG. 1.

There is an electrode defect 7 in the internal electrode layer 2. More specifically, in the present multilayer ceramic capacitor, the dielectric layers 6 and the internal electrode layers 2 are reduced in thickness and increased in number as described above, and for this reason, the coverage of the internal electrode layer 2 on the dielectric layer 6 is decreased due to deformations during stacking, the difference in shrinkage behavior during firing, etc., thereby resulting in the missing internal electrode in the internal electrode layer 2, and inevitably forming a through hole passing through the internal electrode layer 2 in the stacking direction, that is, the electrode defect 7.

Further, in the present embodiment, there is electrode defects containing an Al—Si based oxide mainly containing Al and Si in the electrode defect 7, and the number of electrode defects containing the Al—Si based oxide is supposed to be 30% or more in number ratio with respect to the total number of electrode defects in the internal electrode layer 2.

More specifically, the Si functions as a sintering aid to promote densification of the dielectric layer 6. This Si is present mainly at crystal grain boundaries in the dielectric layer 6, with action to suppress ingress of moisture, and chemical stability to water and acid is believed to be increased by providing the Al—Si based oxide with the addition of the Al to the Si. Further, the presence of the Al—Si based oxide not only at crystal grain boundaries but also in the electrode defect 7 of the internal electrode layer 2 makes it possible to suppress ingress of moisture along the interfaces between the dielectric layer 2 and the internal electrode layers 6.

However, in order for the Al—Si based oxide to exert this moisture inhibitory action, the thickness t of the internal electrode layer 6 needs to be 0.6 µm or less.

More specifically, when the number of electrode defects 7 including the Al—Si based oxide is 30% or more in number ratio with respect to the total number of electrode defects 7 as described above, it is possible to suppress moisture ingress into the electrode defects 7 from the outside.

However, considering that the volume of the electrode defects 7 is also increased with the increased thickness t of the internal electrode layer 2, the thickness t of the internal electrode layer 2 in excess of 0.6 µm makes it difficult to supply a sufficient amount of Al—Si based oxide to the electrode defects 7.

For this reason, in the present embodiment, the thickness t of the internal electrode layer 2 is made 0.6 µm or less.

As just described, in the present embodiment, the dielectric layer 6 contains, as its main constituent, the barium titanate-based compound that has a perovskite-type crystal structure, the internal electrode layer 2 has the electrode defect 7 therein, the internal electrode layer 2 is formed so that the thickness t is 0.6 µm or less, the electrode defect 7 has therein an electrode defect 7 containing the Al—Si based oxide, and the number of the electrode defects 7 containing the Al—Si based oxide is 30% or more in number ratio with respect to the total number of electrode defects in the internal electrode 2. Thus, the Al—Si based oxide exerts the effect of inhibiting moisture ingress, thereby making it possible to suppress failure occurrences even when a high electric field is applied continuously for a long period of time in hot and humid conditions, and achieve a multilayer ceramic capacitor with desired high reliability.

Further, the contents of the Al and Si are not to be considered particularly limited, but from the perspective of ensuring more favorable reliability, the Al is preferably 0.10 to 0.30 parts by mol with respect to 100 parts by mol of Ti, whereas the Si is preferably 1.6 to 4.0 parts by mol with respect to 100 parts by mol of Ti.

In addition, the ceramic sintered body 1 preferably also contains a rare-earth element Re in addition to the Al and Si as accessory constituents. The rare-earth element Re has the effect of inhibiting the transfer of oxygen vacancies, and thus contributes to improvement in reliability. In particular, when the contained molar quantity of the rare-earth element Re is 0.95 to 2.0 parts by mol with respect to 100 parts by mol of Ti, further favorable reliability can be ensured.

Further, this rare-earth element Re is not to be considered particularly limited, but any rare-earth element Re can be used such as Sm, Eu, Gd, Tb, Dy, Ho, Er, Tm, Yb, and Lu.

Furthermore, the ceramic sintered body 1 preferably contains Mg, Mn, V, and Zr as accessory constituents, and containing the accessory constituents also provide more favorable reliability.

It is to be noted that in the case of adding these accessory constituents, it is preferable to adjust the additive amounts in consideration of sinterability and abnormal grain growth. Specifically, it is preferable to contain 0.10 to 2.0 parts by mol of Mg, 0.01 to 0.3 parts by mol of Mn, 0.01 to 3.0 parts by mol of V, and 0.2 to 0.8 parts by mol of Zr with respect to 100 parts by mol of Ti, thereby making it possible to ensure further favorable reliability without leading to degraded sinterability or abnormal grain growth.

In addition, the existence forms of the rare-earth element Re, Mg, Mn, V, and Zr are not to be considered particularly limited, but may be existence as solid solutions in crystal grains, or existence at crystal grain boundaries or crystal triple points. In addition, the forms of the compounds may be oxides such as $Re_2O_3$ and MgO, or composite oxides containing other elements.

Next, a method for producing the multilayer ceramic capacitor described above will be described in detail.

First, a Ba compound, a Ti compound, etc. are prepared as raw materials for the main constituent. Then, these raw materials for the main constituent are weighed in predetermined amounts, and the weighed materials are put along with a grinding medium such as PSZ (Partially Stabilized Zirconia) balls and pure water into a ball mill, subjected to sufficient mixing and grinding in a wet way, and to drying, and then subjected to calcination treatment at a temperature of 1000 to 1200° C. for a predetermined period of time, thereby preparing a main constituent powder composed of a barium titanate based compound with an average grain size of 0.1 to 0.2 µm.

Then, an Al oxide and a Si oxide that have primary particles of 50 nm or less in average particle size are prepared as accessory constituent powders, and a Re oxide containing the rare-earth element Re, a Mg oxide, a Mn oxide, a V oxide, and a Zr oxide are prepared, if necessary. Then, the accessory constituent powders are weighed in predetermined amounts, added to the main constituent powders, then put along with a grinding medium into a ball mill and uniformly dispersed by sufficient mixing in a wet way, and dried to prepare a ceramic raw material powder.

In this regard, the Al oxide and the Si oxide are made 50 nm or less in average particle size, because when any one of the oxides exceeds 50 nm in average particle size, due to the increase in average particle size, there is a possibility that the Al and Si in the ceramic raw material powder will be accumulated in the dielectric layers 6, and kept from transferring to the internal electrode layers 2.

Then, this ceramic raw material powder is put along with an organic binder and a plasticizer, as well as an organic solvent and a grinding medium, into a ball mill and subjected to wet mixing, thereby preparing ceramic slurry, and the ceramic slurry is subjected to shape forming by a doctor blade method or the like to prepare ceramic green sheets.

Then, a conductive material such as a Ni powder is mixed with an organic vehicle and an organic solvent, and subjected to kneading in a triple roll mill or the like, thereby preparing a conductive paste for internal electrodes.

Then, this conductive paste for internal electrodes is used to apply screen printing onto the ceramic green sheets so that the thickness t after firing is 0.6 µm or less, thereby forming a conductive film in a predetermined pattern on the surfaces of the ceramic green sheets.

Then, the multiple ceramic green sheets with the conductive films formed are stacked in a predetermined direction, then sandwiched between ceramic green sheets with no conductive films formed, subjected to pressure bonding, and cut into a predetermined size to prepare a ceramic laminated body. Then, the ceramic laminate is thereafter subjected to binder removal treatment at a temperature of 300 to 500° C., and further subjected to firing treatment in accordance with a predetermined firing profile under a reducing atmosphere composed of a $H_2$—$N_2$—$H_2O$ gas with an oxygen partial pressure controlled to $10^{-9}$ MPa to $10^{-12}$ MPa.

Figure 3:
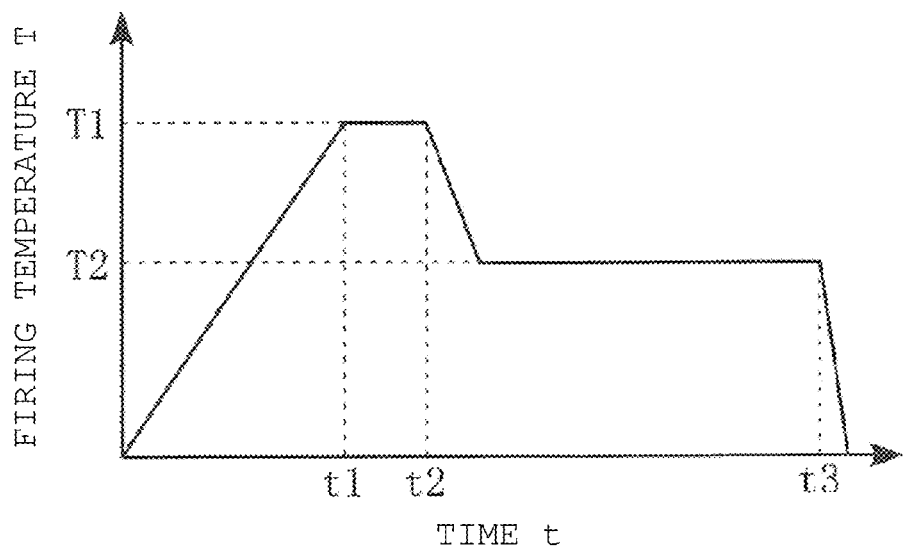
FIG. 3 is a diagram showing an example of a firing profile.

FIG. 3 is a diagram showing an example of the firing profile.

More specifically, first, the temperature in a firing furnace is increased at a predetermined rate of temperature increase to a first firing temperature T1 (for example, 1100 to 1200° C.) that is a top firing temperature. Then, firing treatment is carried out at the first firing temperature T1 for a short period of time $\Delta t1$ (=t2−t1) (for example, on the order of 5 minutes).

The firing for a short period of time at the first firing temperature T1 which is a top firing temperature as just described is adopted because firing for a long period of time causes abnormal grain growth or makes internal electrodes into balls, thereby making it difficult to obtain the thin internal electrodes 2 of 0.6 µm or less in thickness.

Then, firing treatment is carried out for a predetermined period of time $\Delta t2$ (=t3−t2) (for example, 30 minutes or longer) at a second firing temperature T2 that is lower than the first firing temperature T1.

The firing at the second firing temperature T2 that is lower than the first firing temperature T1 as just describe is adopted because there is a possibility that the dielectric layers 6 and the internal electrode layers 2 will be excessively fired and oversintered to damage smoothness, unless the firing temperature is made lower than the first firing temperature which is a top firing temperature. It is to be noted that the second firing temperature T2 is preferably approximately 800 to 1000° C., because the excessively decreased firing temperature leads to decreased sinterability.

This firing provides co-sintered conductive films and ceramic green sheets, thereby preparing the ceramic sintered body 1 with the dielectric layers 6 and internal electrode layers 2 alternately stacked.

The heat treatment for a predetermined period of time at the second firing temperature T2 that is lower than the first firing temperature T1 as just described can effectively transfer the form of the Al—Si based oxide to the internal electrode layers 2 in combination with the action of the Al oxide and Si oxide in terms of average particle size, and allows the number of the electrode defects 7 containing the Al—Si based oxide to be made 30% or more in number ratio with respect to the total number of the electrode defects 7.

Next, a conductive paste for external electrodes is applied onto both end surfaces of the ceramic sintered body 1, and subjected to firing treatment at a temperature of 600 to 800° C. to form the external electrodes 3a and 3b.

It is to be noted that while the conductive material contained in the conductive paste for external electrodes is also not to be considered particularly limited, it is preferable, in terms of reduction in cost, to use a material containing Ag or Cu, or an alloy thereof as its main constituent.

In addition, as a method for forming the external electrodes 3a and 3b, the conductive paste for external electrodes may be applied onto the both end surfaces of the ceramic laminate, and then subjected to firing treatment at the same time as the ceramic laminated body.

Then, finally, electrolytic plating is applied to form first plating films 4a, 4b composed of Ni, Cu, a Ni—Cu alloy, or the like on the surfaces of the external electrodes 3a and 3b, and further form second plating films 5a, 5b composed of solder, tin, or the like on the surfaces of the first plating films 4a and 4b, thus allowing for the production of a laminated ceramic capacitor.

It is to be noted that the present invention is not to be considered limited to the embodiment described above, and various changes can be obviously made without departing from the spirit and scope of the present invention. Furthermore, while the preferred ranges of the contents of the Al, Si, Mg, Mn, V, Zr, and rare-earth element Re have been mentioned for the ceramic sintered body as a laminated body in the present embodiment, the same preferred ranges as in the case of the ceramic sintered body also apply to a dissolved state of the ceramic sintered body 1 subjected to dissolution treatment.

Next, examples of the present invention will be described specifically.

EXAMPLE 1

Preparation of Sample $BaCO_3$ and $TiO_2$ were prepared as raw materials for the main constituent, and $BaCO_3$ and $TiO_2$ were weighed in predetermined amounts so as to make Ba and Ti equimolar. Then, these weighed materials were put along with PSZ balls and pure water into a ball mill, subjected to sufficient mixing and grinding in a wet way, and to drying, and then subjected to calcination treatment at a temperature of 1000° C. for about 2 hours, thereby preparing a main constituent powder composed of $BaTiO_3$ with an average grain size of 0.15 µm.

Next, as raw materials for accessory constituents, $Al_2O_3$ of 20 to 200 nm in average particle size and $SiO_2$ of 30 to 155 nm in average particle size were prepared, and $Dy_2O_3$, $MgCO_3$, $MnO_2$, $V_2O_5$, and $ZrO_2$ were further prepared. Then, the $Al_2O_3$, $SiO_2$, $Dy_2O_3$, $MgCO_3$, $MnO_2$, $V_2O_5$, and $ZrO_2$ were weighed so that Al, Si, Dy, Mg, Mn, V, and Zr were respectively 0.25 parts by mol, 2.00 parts by mol, 0.80 parts by mol, 1.00 part by mol, 0.15 parts by mol, 0.15 parts by mol, and 0.15 parts by mol with respect to 100 parts by mol of Ti.

Then, the weighed materials were added to the main constituent powder, and the materials and the powder were put along with PSZ balls and pure water into a ball mill, uniformly dispersed by sufficient mixing and grinding in a wet way, and then subjected to drying treatment, thereby providing a ceramic raw material powder.

It is to be noted that the ceramic raw material powder was dissolved in an acid, and subjected to a component analysis by inductively-coupled plasma (ICP) emission spectrometry to confirm that the powder was substantially identical to the prepared composition.

Next, the ceramic raw material powder was put along with ethanol and a polyvinyl butyral based binder, as well as a plasticizer, PSZ balls, and an organic solvent into a ball mill, and subjected to wet mixing, thereby preparing ceramic slurry, and the ceramic slurry was further subjected to shape forming by a doctor blade method, thereby preparing ceramic green sheets so as to provide a thickness of 0.7 μm after firing.

Then, a conductive paste for internal electrodes was prepared containing a Ni powder, an organic vehicle, and an organic solvent.

Next, the conductive paste for internal electrodes was used to apply screen printing onto the ceramic green sheets so that the fired internal electrode layer was 0.39 to 0.91 μm in thickness, thereby forming a conductive film in a predetermined pattern on the surfaces of the ceramic green sheets.

Then, a predetermined number of ceramic green sheets with the conductive films formed thereon was stacked, sandwiched between ceramic green sheets with no conductive films formed, subjected to pressure bonding, and cut into a predetermined size to prepare a ceramic laminated body. Then, the laminate was subjected to binder removal treatment by heating for 3 hours at a temperature of 300° C. under a nitrogen atmosphere, and then subjected to firing treatment for 5 minutes with the top firing temperature (first firing temperature T1) set to 1200° C., and further firing treatment for 0.1 to 5.0 hours at the second firing temperature T2 achieved by lowering the firing temperature to 600 to 1000° C., under a reducing atmosphere composed of a $H_2$—$N_2$—$H_2O$ gas with an oxygen partial pressure controlled to $10^{-9}$ MPa, thereby providing the co-sintered conductive films and ceramic green sheets, and preparing a ceramic sintered body with the internal electrode layers buried.

Next, a conductive paste for external electrodes was prepared containing a Cu powder and $B_2O_3$—$Li_2O$—$SiO_2$—BaO based glass frit. Then, the conductive paste for external electrodes was applied onto both end surfaces of the ceramic sintered body, and subjected to firing treatment at a temperature of 800° C. under a nitrogen atmosphere to form external electrodes, thereby preparing samples of sample numbers 1 to 38.

In addition, a sample of sample number 39 was prepared in the same way and in accordance with the same procedure as the sample number 25, except that the firing treatment was carried out only at the top firing temperature of 1200° C.

The obtained samples were 0.7 μm in dielectric layer thickness, the external dimensions of the samples were 0.6 mm in length L, 0.3 mm in width W, and 0.3 mm in thickness T, the area of the electrode opposed per dielectric layer was 0.5 mm², and the effective number of dielectric ceramic layers was 100.

It is to be noted that the ceramic sintered body (laminated body) after removing the external electrodes of each prepared sample was dissolved in an acid, and subjected to a component analysis by inductively-coupled plasma (ICP) emission spectrometry to confirm that the body was substantially identical to the prepared composition, except for the internal electrode constituent Ni.

[Evaluations of Samples]

(Thickness of Internal Electrode Layer)

Figure 4:
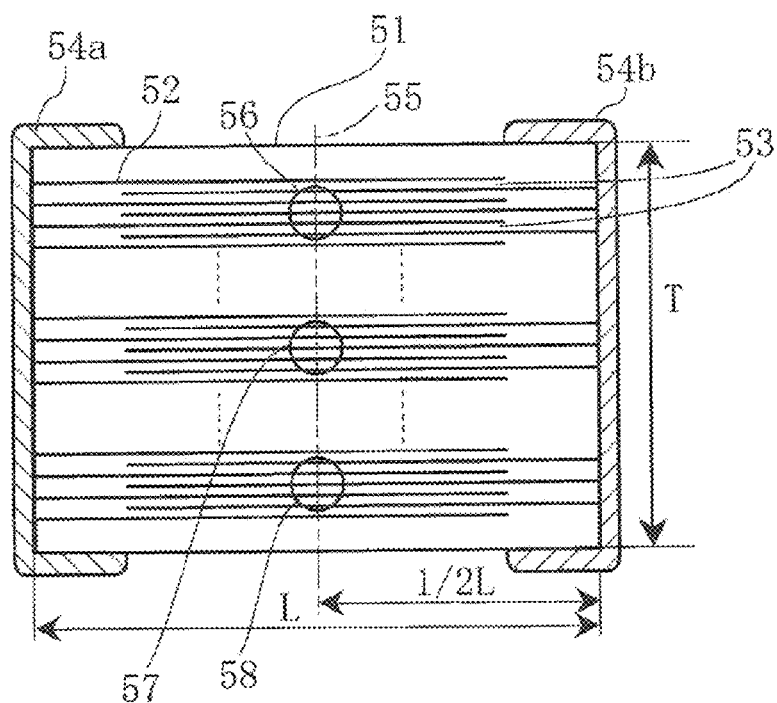
FIG. 4 is a cross-sectional view of a sample for explaining a method for measuring the thickness of an internal electrode.

FIG. 4 is a cross-sectional view illustrating the internal structure of the sample, and the sample has a ceramic sintered body 51 sintered in the form of internal electrode layers 52 and dielectric layers 53 stacked alternately, and further has external electrodes 54a, 54b formed on both ends of the ceramic sintered body 51.

Then, the thickness of the internal electrode layer 52 was measured by the following method.

First, for three samples for each of sample numbers 1 to 39, each sample was left vertical, and wrapped with a resin so as to expose a side surface (surface LT) with a length L (=0.6 mm) and a thickness T (=0.3 mm).

Then, the ceramic sintered body 51 was polished in the width direction (in a direction perpendicular to the plane of paper), and the side surface was polished with a polishing machine until the width dimension W reached on the order of ½ W.

It is to be noted that in order to eliminate shear drop of the internal electrode layers due to the polishing, the polished surface was processed with the use of an ion milling method after the completion of the polishing.

Next, on a center line 55 perpendicular to the internal electrode layers 52 at a distance ½ L from an end of the length L of the ceramic sintered body 51, a region of the ceramic sintered body 51 where the internal electrode layers 52 were stacked was divided into three parts in the direction of thickness T, and the respective regions were regarded as an upper region 56, an intermediate region 57, and a lower region 58.

Then, a SEM (scanning microscope) was used to measure the thickness of the five internal electrode layers 52 excluding the outermost internal electrode layers in each region of the upper region 56, intermediate region 57, and lower region 58, and the average value for the respective measurement values was regarded as the thickness of the internal electrode layer 52. More specifically, for each of the three regions for each of the three samples, the thickness of the five internal electrode layers 52 was observed and measured with the SEM, and the average value for the respective samples, that is, the average value for the forty-five points (=3×3×5) was regarded as the thickness of the internal electrode layer 52 for each sample number.

It is to be noted that electrode defects were excluded in the thickness measurement for the internal electrode layers.

(Check of Electrode Defect and Al—Si Based Oxide)

For three samples for each of sample numbers 1 to 39, polishing treatment was carried out in the same way and in accordance with the same procedure as in the case of the thickness measurement for the internal electrode layers.

Next, FE-SEM-WDX (field-emission scanning electron microscope-wavelength-dispersive X-ray spectrometer) was used to analyze a substantially central part of the polished cross section, check the presence of an electrode defect and an Al—Si based oxide in the electrode defect, and further analyze the elements of the Al—Si based oxide.

In this regard, the electrode defect was regarded as a site where the internal electrode missed in the internal electrode layer, with the formation of a through hole passing through the internal electrode layer.

Figure 5A:
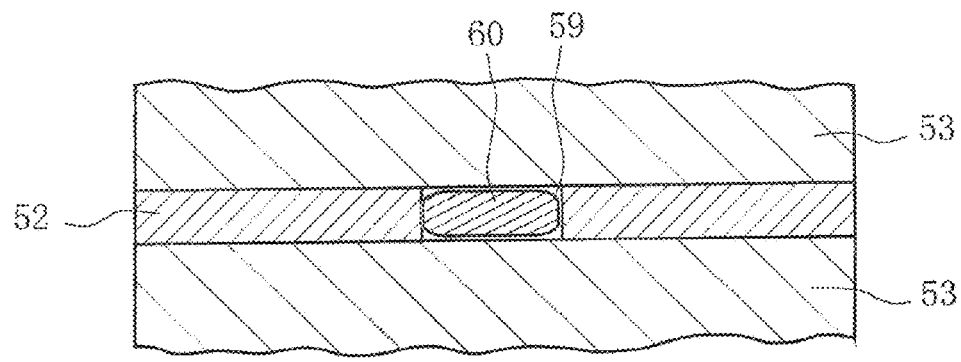
FIGS. 5A to 5C are diagrams illustrating an example in the case of determining that there is an Al—Si based oxide in an electrode defect.
Figure 5B:
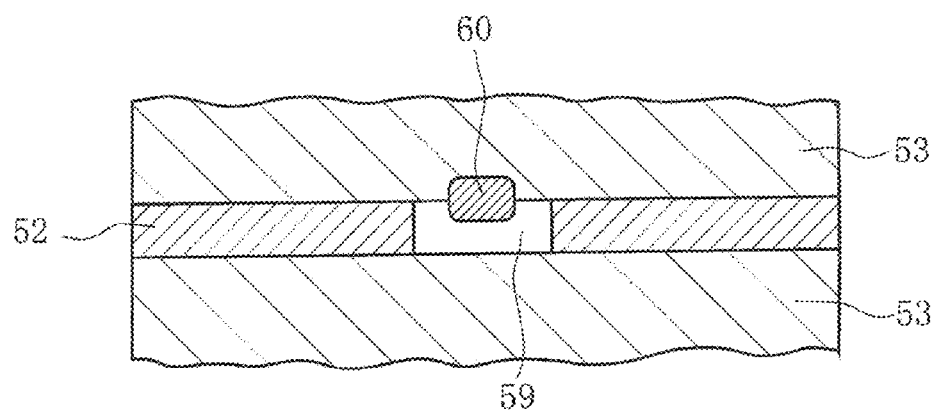
Figure 5C:
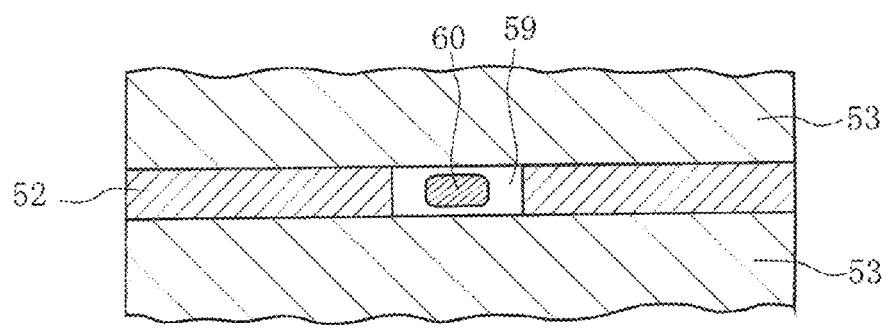
Figure 6:
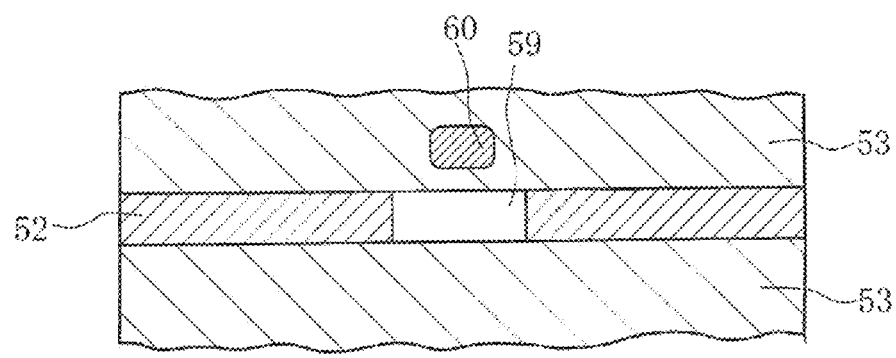
FIG. 6 is a diagram illustrating an example in the case of determining that there is no Al—Si based oxide in an electrode defect.

FIGS. 5A to 5C schematically illustrate a case in which there is an Al—Si based oxide 60 in an electrode defect 59, whereas FIG. 6 schematically illustrates a case in which there is no Al—Si based oxide 60 in the electrode defect 59.

More specifically, it has been determined that the Al—Si based oxide 60 is present in the electrode defect 59, when the Al—Si based oxide 60 is distributed substantially over the entire area of the electrode defect 59 as shown in FIG. 5A, when the Al—Si based oxide 60 is distributed to form a bridge between a dielectric layer 53 and the electrode defect 59 as shown in FIG. 5B, and when the Al—Si based oxide 60 is distributed partially in the electrode defect 59 as shown in FIG. 5C.

Alternatively, it has been determined that the Al—Si based oxide 60 is not present in the electrode defect 59 when the Al—Si based oxide 60 is not present in the electrode defect 59, but present in the dielectric layer 53 as shown in FIG. 6.

The Al—Si based oxide was checked by irradiating each sample at an acceleration voltage of 15 kV and an irradiation current of 50 nA with the use of a WDX spectrometer (from JEOL Ltd., JXA-8500F). It has been determined an oxide is the Al—Si based oxide when the total contained molar quantity of Al and Si is 50 mol % or more among the elements forming the oxide other than oxygen.

Then, for each sample of sample numbers 1 to 39, the total number of the electrode defects 59 and the number of the electrode defects 59 containing the Al—Si based oxide 60 were each counted in a field of view of 10 μm by 10 μm, and the ratio of the number of the electrode defects 59 containing the Al—Si based oxide 60 to the total number of the electrode defects 59, that is, the number ratio was figured out to evaluate the existence state of the Al—Si based oxide 60. Then, the sample with the number ratio of 30% or more is regarded as "◯" on the basis of a determination that the Al—Si based oxide 60 is present enough in the electrode defect 59, whereas the sample with the number ratio less than 30% is regarded as "x" on the basis of a determination that the Al—Si based oxide 60 is not present enough in the electrode defect 59.

(Moisture Load Test)

Seventy samples for each of sample numbers 1 to 39 were subjected to a moisture load test to evaluate the reliability.

In this regard, in the moisture load test, a direct-current voltage of 6.3 V was applied to the external electrodes 54a, 54b at a temperature of 85° C. and a relative humidity of 85%, and the insulation resistance at room temperature was measured after 1000 hours and after 2000 hours from the start of the test. Then, the sample with the insulation resistance of 1 MΩ or less was determined as a defective to evaluate the reliability in hot and humid conditions.

Table 1 shows the average particle sizes of Al and Si, the second firing temperature, the second firing time, the existence state of the Al—Si based composite oxide in the electrode defect, the thickness of the internal electrode layer, and the measurement results in the moisture load test, for each sample of sample numbers 1 to 39.

TABLE 1

| Sample No. | Average Particle Size (nm) $Al_2O_3$ | Average Particle Size (nm) $SiO_2$ | Second Firing Temperature (° C.) | Second Firing Time (hr) | Existence State of Al—Si based Oxide in Electrode Defect | Thickness of Internal Electrode Layer (μm) | Number of Failures in Moisture Load Test 1000 hours | Number of Failures in Moisture Load Test 2000 hours |
|---|---|---|---|---|---|---|---|---|
| 1*[1] | 20 | 30 | 600 | 0.1 | x | 0.57 | 4/70 | 9/70 |
| 2*[1] | 20 | 30 | 600 | 0.5 | x | 0.48 | 3/70 | 8/70 |
| 3*[1] | 20 | 30 | 600 | 1.0 | x | 0.60 | 3/70 | 7/70 |
| 4*[1] | 20 | 30 | 600 | 2.0 | x | 0.57 | 3/70 | 8/70 |
| 5*[1] | 20 | 30 | 600 | 5.0 | x | 0.40 | 2/40 | 5/70 |
| 6*[1] | 20 | 30 | 700 | 0.1 | x | 0.39 | 3/70 | 6/70 |
| 7*[1] | 20 | 30 | 700 | 0.5 | x | 0.59 | 3/70 | 7/70 |
| 8*[1] | 20 | 30 | 700 | 1.0 | x | 0.51 | 2/70 | 5/70 |
| 9*[1] | 20 | 30 | 700 | 2.0 | x | 0.49 | 2/70 | 4/70 |
| 10*[1] | 20 | 30 | 700 | 5.0 | x | 0.53 | 2/70 | 4/70 |
| 11*[1] | 20 | 30 | 800 | 0.1 | x | 0.58 | 2/70 | 4/70 |
| 12*[1] | 20 | 30 | 800 | 0.5 | x | 0.52 | 1/70 | 9/70 |
| 13*[1] | 20 | 30 | 800 | 1.0 | x | 0.57 | 1/70 | 2/70 |
| 14 | 20 | 30 | 800 | 2.0 | ◯ | 0.53 | 0/70 | 0/70 |
| 15 | 20 | 30 | 800 | 5.0 | ◯ | 0.54 | 0/70 | 0/70 |
| 16*[1] | 20 | 30 | 900 | 0.1 | x | 0.57 | 0/70 | 2/70 |
| 17 | 20 | 30 | 900 | 0.5 | ◯ | 0.56 | 0/70 | 0/70 |
| 18 | 20 | 30 | 900 | 1.0 | ◯ | 0.59 | 0/70 | 0/70 |
| 19 | 20 | 30 | 900 | 2.0 | ◯ | 0.48 | 0/70 | 0/70 |
| 20 | 20 | 30 | 900 | 5.0 | ◯ | 0.53 | 0/70 | 0/70 |
| 21 | 20 | 30 | 1000 | 0.1 | ◯ | 0.59 | 0/70 | 0/70 |
| 22 | 20 | 30 | 1000 | 0.5 | ◯ | 0.57 | 0/70 | 0/70 |
| 23 | 20 | 30 | 1000 | 1.0 | ◯ | 0.53 | 0/70 | 0/70 |
| 24 | 20 | 30 | 1000 | 2.0 | ◯ | 0.57 | 0/70 | 0/70 |
| 25 | 20 | 30 | 1000 | 5.0 | ◯ | 0.55 | 0/70 | 0/70 |
| 26 | 45 | 35 | 1000 | 0.5 | ◯ | 0.59 | 0/70 | 0/70 |
| 27 | 50 | 50 | 1000 | 0.5 | ◯ | 0.48 | 0/70 | 0/70 |
| 28*[1] | 45 | 70 | 1000 | 0.5 | x | 0.55 | 4/70 | 5/70 |
| 29*[1] | 65 | 45 | 1000 | 0.5 | x | 0.57 | 2/70 | 4/70 |
| 30*[1] | 85 | 70 | 1000 | 0.5 | x | 0.53 | 1/70 | 3/70 |
| 31*[1] | 100 | 110 | 1000 | 0.5 | x | 0.48 | 3/70 | 4/70 |
| 32*[1] | 140 | 120 | 1000 | 0.5 | x | 0.56 | 2/70 | 5/70 |
| 33*[1] | 200 | 155 | 1000 | 0.5 | x | 0.59 | 3/70 | 6/70 |
| 34*[1] | 20 | 30 | 800 | 0.1 | x | 0.85 | 6/70 | 12/70 |
| 35*[1] | 20 | 30 | 800 | 0.5 | x | 0.69 | 5/70 | 9/70 |
| 36*[1] | 20 | 30 | 800 | 1.0 | x | 0.63 | 4/70 | 5/70 |

TABLE 1-continued

| Sample No. | Average Particle Size (nm) | | Second Firing Temperature (° C.) | Second Firing Time (hr) | Existence State of Al—Si based Oxide in Electrode Defect | Thickness of Internal Electrode Layer (μm) | Number of Failures in Moisture Load Test | |
|---|---|---|---|---|---|---|---|---|
| | $Al_2O_3$ | $SiO_2$ | | | | | 1000 hours | 2000 hours |
| 37*[1] | 20 | 30 | 800 | 2.0 | x | 0.71 | 2/70 | 4/70 |
| 38*[1] | 20 | 30 | 800 | 5.0 | x | 0.91 | 1/70 | 3/70 |
| 39*[1] | 20 | 30 | — | — | x | 0.54 | 4/70 | 7/70 |

*[1]outside the scope of the present invention (claim 1)

In the sample numbers 1 to 10, the electrode defect containing the Al—Si based oxide was not present enough. This is because the second firing temperature of 700° C. was too low to transfer the Al—Si based oxide accumulated in the dielectric layers to the internal electrode layers, even in the case of firing for 5 hours at the second firing temperature. For this reason, it has been determined that these samples are inferior in reliability, with two to four defective pieces already generated at the point of the lapse of 1000 hours after the start of the test, and increased to four to nine defective pieces at the point of the lapse of 2000 hours after the start of the test.

In addition, in the sample numbers 11 to 13, the electrode defect containing the Al—Si based oxide was not present enough as in the sample numbers 1 to 10. This is because the second firing time of 0.1 to 1 hour was too short to promote the transfer of the Al—Si based oxide to the internal electrode layers, although the second firing temperature was 800° C. For this reason, it has been determined that these samples are inferior in reliability, with one to two defective pieces already generated at the point of the lapse of 1000 hours after the start of the test, and increased to two to nine defective pieces at the point of the lapse of 2000 hours after the start of the test.

In addition, in the sample number 16, the electrode defect containing the Al—Si based oxide was not present enough as in the sample numbers 11 to 13, because the second firing temperature of 0.1 hours was extremely short although the second firing temperature was 900° C. For this reason, desired reliability was not able to be ensured, with two defective pieces generated at the point of the lapse of 2000 hours after the start of the test, although no defective piece was generated at the point of the lapse of 1000 hours after the start of the test.

In the sample numbers 28 to 33, the Al—Si based oxide was not present enough in the electrode defects, because primary particles of at least one of $Al_2O_3$ and $SiO_2$ were greater than 50 nm in average particle size. For this reason, it has been determined that the samples are inferior in reliability, with one to four defective pieces already generated at the point of the lapse of 1000 hours after the start of the test, and increased to three to six defective pieces at the point of the lapse of 2000 hours after the start of the test.

In the sample numbers 34 to 38, because of the internal electrode layers in excess of 0.6 μm in thickness, the electrode defects were increased in volume, thereby resulting in failure to supply the Al—Si based oxide enough to the electrode defects, and for this reason, the Al—Si based oxide was not present enough in the electrode defects. As a result, it has been determined that the samples are inferior in reliability, with one to six defective pieces already generated at the point of the lapse of 1000 hours after the start of the test, and increased to three to twelve defective pieces at the point of the lapse of 2000 hours after the start of the test.

In addition, in the sample number 39, the electrode defect containing the Al—Si based oxide was not present enough, because the firing treatment was carried out only at 1200° C. as the top firing temperature. As a result, it has been determined that the samples are inferior in reliability, with four defective pieces already generated at the point of the lapse of 1000 hours after the start of the test, and increased to seven defective pieces at the point of the lapse of 2000 hours after the start of the test.

In contrast, in the sample numbers 14, 15, and 17 to 27, it has been determined that the samples have high reliability with favorable moisture load characteristics, without any defective piece generated even after the lapse of 2000 hours after the start of the test, because of the internal electrode layers of 0.6 μm or less in thickness and the enough presence of the electrode defect containing the Al—Si based oxide.

Figure 7:
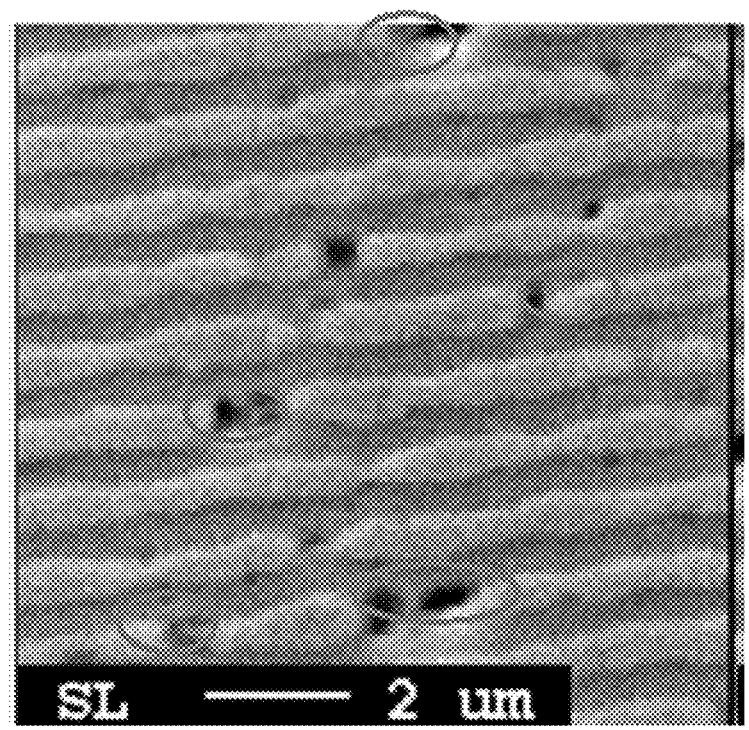
FIG. 7 is a SEM image obtained by imaging electrode defects in sample number 19 with a scanning electron microscope (hereinafter, referred to as a "SEM").

FIG. 7 is a SEM image of electrode defect in sample number 19, which shows a distribution state of the Al—Si based oxide.

Figure 8:
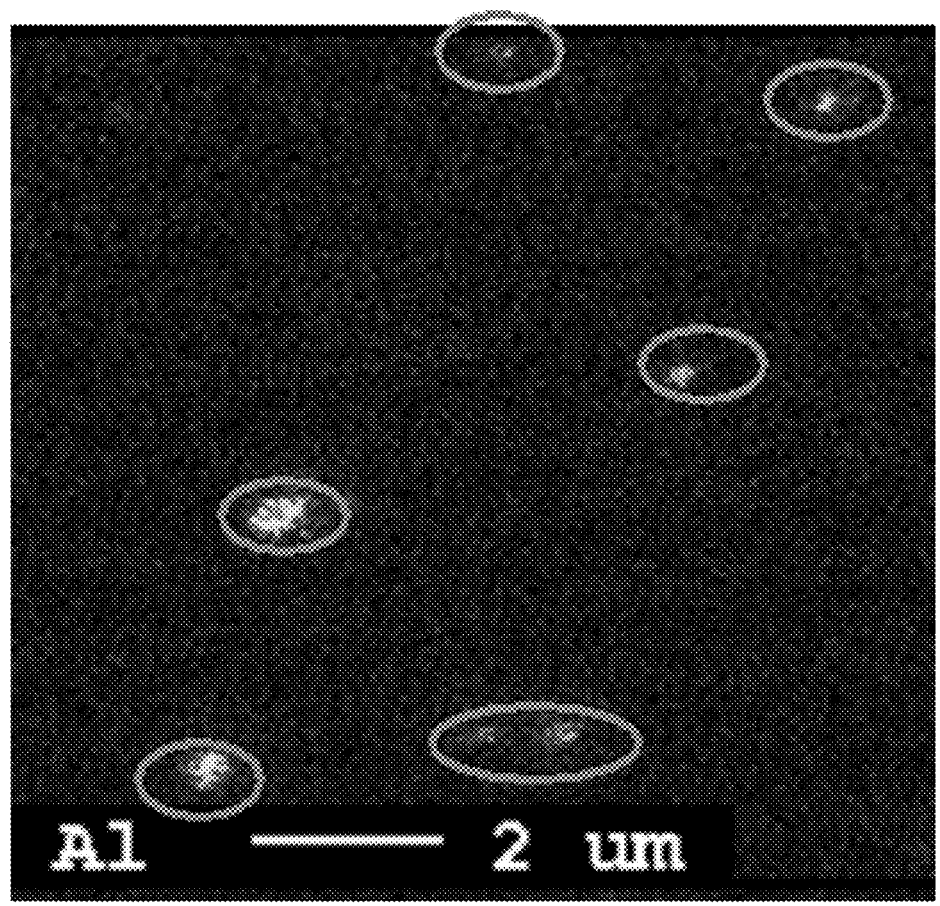
FIG. 8 is a diagram showing a distribution state of Al in electrode defects in the sample number 19, which is a mapping image obtained with a field-emission scanning electron microscope-wavelength-dispersive X-ray spectrometer (hereinafter, referred to as "FE-SEM-WDX").
Figure 9:
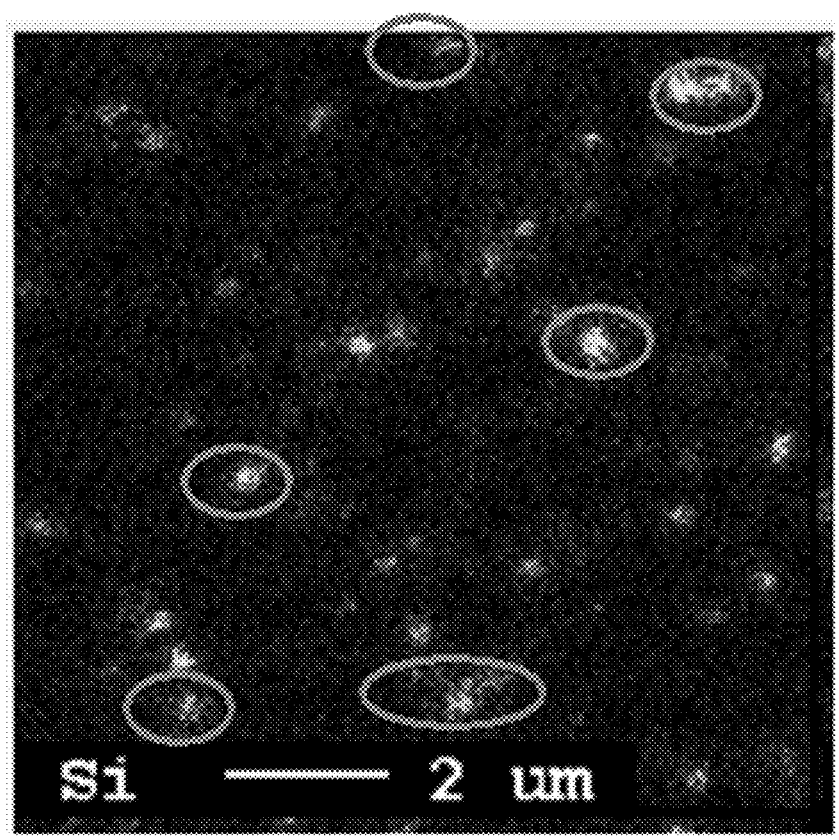
FIG. 9 is a diagram showing a distribution state of Si in electrode defects in the sample number 19, which is a mapping image obtained with the FE-SEM-WDX".

In addition, FIGS. 8 and 9 are mapping images of electrode defects, obtained by FE-SEM-WDX, and FIG. 8 shows a distribution state of Al, whereas FIG. 9 shows a distribution state of Si.

In FIGS. 7 through 9, circled points refer to positions of the Al—Si based oxide distributed.

It has been determined that the oxide is distributed in the electrode defect as is clear from FIG. 7 herein, whereas the Al—Si based oxide is present in the electrode defect due to the fact that Al and Si are present in the positions where the oxide is present as is clear from FIGS. 8 and 9.

EXAMPLE 2

Samples were prepared by differently varying the respective contents of accessory constituents with respect to 100 parts by mol of Ti, and evaluated.

More specifically, the respective accessory constituents were weighed so that Al, Si, Dy, Mg, Mn, V, and Zr were respectively 0.00 to 0.45 parts by mol, 0.80 to 5.90 parts by mol, 0.80 to 2.30 parts by mol, 0.08 to 2.40 parts by mol, 0 to 0.45 parts by mol, 0 to 0.45 parts by mol, and 0.10 to 0.90 parts by mol with respect to 100 parts by mol of Ti. Except for this weighing, the samples of sample numbers 41 to 69 were prepared in the same way and in accordance with the same procedure as for the sample number 22 in [Example 1].

In addition, except that Yb or La was weighed in place of Dy to be 1.40 parts by mol with respect to 100 parts by mol of Ti, and further that Al, Si, Mg, Mn, V, and Zr were respectively 0.15 parts by mol, 2.00 parts by mol, 1.10 parts by mol, 0.15 parts by mol, 0.15 parts by mol, and 0.40 parts by mol with respect to 100 parts by mol of Ti, the samples of sample numbers 70, 71 were prepared in the same way and in accordance with the same procedure as for the sample number 22 in [Example 1].

The dielectric layers were 0.8 μm in thickness, and the internal electrode layers were 0.5 μm in thickness measured in the same way and in accordance with the same procedure as in [Example 1].

The ceramic sintered body (laminated body) after removing the external electrodes of each prepared sample was dissolved in an acid, and subjected to a component analysis by inductively-coupled plasma (ICP) emission spectrometry to confirm that the body was substantially identical to the prepared composition, except for the internal electrode constituent Ni.

Furthermore, for each of the samples prepared, the number of electrode defects and the number of Al—Si based oxides (sample number 41 to 68, 70, 71) or Si based oxides (sample number 69) present in the electrode defects were counted to figure out the number ratios in the same way and in accordance with the same procedure as in [Example 1], and it has been confirmed that the ratios are all 30% or more.

Next, for each sample of sample numbers 41 to 71, reliability was evaluated in the same way and in accordance with the same procedure as in [Example 1]. Further, in Example 2 herein, reliability was evaluated by figuring out the number of defective pieces generated at the point of a lapse of 3000 hours, in addition to 1000 hours and 2000 hours after the start of the moisture load test.

Table 2 shows the respective contained molar quantities of the Al, Si, Dy, Yb, La, Mg, Mn, V, and Zr contained in each sample of sample numbers 41 to 71 with respect to 100 parts by mol of Ti, and the measurement results in the moisture load test.

It has been determined that the sample number 69 is inferior in reliability, with five defective pieces generated at the point of the lapse of 1000 hours, and further nine defective pieces generated at the point of the lapse of 2000 hours. This is believed to be because the sample containing therein Si, but no Al was thus inferior in chemical stability to water and acid, thereby resulting in failure to adequately suppress ingress of moisture.

In contrast, the sample numbers 41 to 68 have succeeded in achieving favorable reliability, without any defective pieces generated at all even at the point of the lapse of 2000 hours after the start of the test.

From the foregoing, it has been determined that there is a need for the Al—Si based oxide contained in the electrode defects, due to the fact that adequate reliability is not able to be achieved with only the Si based oxide contained in the electrode defects.

However, in the case of sample number 41, two defective pieces were generated at the point of the lapse of 3000 hours after the start of the test, because of the low Al content of 0.08 parts by mol with respect to 100 parts by mol of Ti.

On the other hand, in the case of sample number 44, four defective pieces were generated at the point of the lapse of 3000 hours after the start of the test, because of the high Al content of 0.45 parts by mol with respect to 100 parts by mol of Ti.

In contrast, it has been determined that the sample numbers 42, 43 can ensure further favorable reliability, without any defective piece generated at all even at the point of the

TABLE 2

| Sample No. | Contained Molar Quantity (parts by mol) | | | | | | | | | Number of Failures in Moisture Load Test | | |
|---|---|---|---|---|---|---|---|---|---|---|---|---|
| | Al | Si | Dy | Yb | La | Mg | Mn | V | Zr | 1000 hours | 2000 hours | 3000 hours |
| 41*[2) | 0.08 | 2.00 | 1.40 | — | — | 1.10 | 0.15 | 0.15 | 0.40 | 0/70 | 0/70 | 2/70 |
| 42 | 0.10 | 2.00 | 1.40 | — | — | 1.10 | 0.15 | 0.15 | 0.40 | 0/70 | 0/70 | 0/70 |
| 43 | 0.30 | 2.00 | 1.40 | — | — | 1.10 | 0.15 | 0.15 | 0.40 | 0/70 | 0/70 | 0/70 |
| 44*[2) | 0.45 | 2.00 | 1.40 | — | — | 1.10 | 0.15 | 0.15 | 0.40 | 0/70 | 0/70 | 4/70 |
| 45*[2) | 0.15 | 0.80 | 1.40 | — | — | 1.10 | 0.15 | 0.15 | 0.40 | 0/70 | 0/70 | 2/70 |
| 46 | 0.15 | 1.60 | 1.40 | — | — | 1.10 | 0.15 | 0.15 | 0.40 | 0/70 | 0/70 | 0/70 |
| 47 | 0.15 | 4.00 | 1.40 | — | — | 1.10 | 0.15 | 0.15 | 0.40 | 0/70 | 0/70 | 0/70 |
| 48*[2) | 0.15 | 5.90 | 1.40 | — | — | 1.10 | 0.15 | 0.15 | 0.40 | 0/70 | 0/70 | 4/70 |
| 49*[3) | 0.15 | 2.00 | 0.80 | — | — | 1.10 | 0.15 | 0.15 | 0.40 | 0/70 | 0/70 | 2/70 |
| 50 | 0.15 | 2.00 | 0.95 | — | — | 1.10 | 0.15 | 0.15 | 0.40 | 0/70 | 0/70 | 0/70 |
| 51 | 0.15 | 2.00 | 2.00 | — | — | 1.10 | 0.15 | 0.15 | 0.40 | 0/70 | 0/70 | 0/70 |
| 52*[3) | 0.15 | 2.00 | 2.30 | — | — | 1.10 | 0.15 | 0.15 | 0.40 | 0/70 | 0/70 | 3/70 |
| 53*[3) | 0.15 | 2.00 | 1.40 | — | — | 0.08 | 0.15 | 0.15 | 0.40 | 0/70 | 0/70 | 2/70 |
| 54 | 0.15 | 2.00 | 1.40 | — | — | 0.10 | 0.15 | 0.15 | 0.40 | 0/70 | 0/70 | 0/70 |
| 55 | 0.15 | 2.00 | 1.40 | — | — | 2.00 | 0.15 | 0.15 | 0.40 | 0/70 | 0/70 | 0/70 |
| 56*[3) | 0.15 | 2.00 | 1.40 | — | — | 2.40 | 0.15 | 0.15 | 0.40 | 0/70 | 0/70 | 4/70 |
| 57*[3) | 0.15 | 2.00 | 1.40 | — | — | 1.10 | 0.00 | 0.15 | 0.40 | 0/70 | 0/70 | 2/70 |
| 58 | 0.15 | 2.00 | 1.40 | — | — | 1.10 | 0.01 | 0.15 | 0.40 | 0/70 | 0/70 | 0/70 |
| 59 | 0.15 | 2.00 | 1.40 | — | — | 1.10 | 0.30 | 0.15 | 0.40 | 0/70 | 0/70 | 0/70 |
| 60*[3) | 0.15 | 2.00 | 1.40 | — | — | 1.10 | 0.45 | 0.15 | 0.40 | 0/70 | 0/70 | 3/70 |
| 61*[3) | 0.15 | 2.00 | 1.40 | — | — | 1.10 | 0.15 | 0.00 | 0.40 | 0/70 | 0/70 | 1/70 |
| 62 | 0.15 | 2.00 | 1.40 | — | — | 1.10 | 0.15 | 0.01 | 0.40 | 0/70 | 0/70 | 0/70 |
| 63 | 0.15 | 2.00 | 1.40 | — | — | 1.10 | 0.15 | 0.30 | 0.40 | 0/70 | 0/70 | 0/70 |
| 64*[3) | 0.15 | 2.00 | 1.40 | — | — | 1.10 | 0.15 | 0.45 | 0.40 | 0/70 | 0/70 | 3/70 |
| 65*[3) | 0.15 | 2.00 | 1.40 | — | — | 1.10 | 0.15 | 0.15 | 0.10 | 0/70 | 0/70 | 2/70 |
| 66 | 0.15 | 2.00 | 1.40 | — | — | 1.10 | 0.15 | 0.15 | 0.20 | 0/70 | 0/70 | 0/70 |
| 67 | 0.15 | 2.00 | 1.40 | — | — | 1.10 | 0.15 | 0.15 | 0.80 | 0/70 | 0/70 | 0/70 |
| 68*[3) | 0.15 | 2.00 | 1.40 | — | — | 1.10 | 0.15 | 0.15 | 0.90 | 0/70 | 0/70 | 4/70 |
| 69*[1) | 0.00 | 2.00 | 1.40 | — | — | 1.10 | 0.15 | 0.15 | 0.40 | 5/70 | 9/70 | 15/70 |
| 70 | 0.15 | 2.00 | — | 1.40 | — | 1.10 | 0.15 | 0.15 | 0.40 | 0/70 | 0/70 | 0/70 |
| 71 | 0.15 | 2.00 | — | — | 1.40 | 1.10 | 0.15 | 0.15 | 0.40 | 0/70 | 0/70 | 0/70 |

*[1)outside the scope of the present invention (claim 1)
*[2)outside the scope of the present invention (claim 2)
*[3)outside the scope of the present invention (claim 3)

lapse of 3000 hours after the start of the test, because the Al content is 0.10 to 0.30 parts by mol with respect to 100 parts by mol of Ti.

In addition, in the case of sample number 45, two defective pieces were generated at the point of the lapse of 3000 hours after the start of the test, because of the low Si content of 0.80 parts by mol with respect to 100 parts by mol of Ti.

On the other hand, in the case of sample number 48, four defective pieces were generated at the point of the lapse of 3000 hours after the start of the test, because of the high Si content of 5.90 parts by mol with respect to 100 parts by mol of Ti.

In contrast, it has been determined that the sample numbers 46, 47 can ensure further favorable reliability, without any defective piece generated at all even at the point of the lapse of 3000 hours after the start of the test, because the Si content is 1.60 to 4.00 parts by mol with respect to 100 parts by mol of Ti.

In addition, in the case of sample number 49, two defective pieces were generated at the point of the lapse of 3000 hours after the start of the test, because of the low Dy content of 0.80 parts by mol with respect to 100 parts by mol of Ti.

On the other hand, in the case of sample number 52, three defective pieces were generated at the point of the lapse of 3000 hours after the start of the test, because of the high Dy content of 2.30 parts by mol with respect to 100 parts by mol of Ti.

In contrast, it has been determined that the sample numbers 50, 51 can ensure further favorable reliability, without any defective piece generated at all even at the point of the lapse of 3000 hours after the start of the test, because the Dy content is 0.95 to 2.00 parts by mol with respect to 100 parts by mol of Ti.

Furthermore, as is clear from the sample numbers 70, 71, it has been determined that there is not any defective piece generated at all at the point of the lapse of 3000 hours even in the case of using Yb or La as the rare-earth element Re. More specifically, it has been determined that the rare-earth element Re, which is not limited to Dy, can ensure favorable reliability, and ensure further favorable reliability, further when the rare-earth element Re is contained to be 0.95 to 2.00 parts by mol with respect to 100 parts by mol of Ti.

In addition, in the case of sample number 53, two defective pieces were generated at the point of the lapse of 3000 hours after the start of the test, because of the low Mg content of 0.08 parts by mol with respect to 100 parts by mol of Ti.

On the other hand, in the case of sample number 56, four defective pieces were generated at the point of the lapse of 3000 hours after the start of the test, because of the high Mg content of 2.40 parts by mol with respect to 100 parts by mol of Ti.

In contrast, it has been determined that the sample numbers 54, 55 can ensure further favorable reliability, without any defective piece generated at all even at the point of the lapse of 3000 hours after the start of the test, because the Mg content is 0.10 to 2.00 parts by mol with respect to 100 parts by mol of Ti.

In addition, in the case of sample number 57, because of no Mn contained, two defective pieces were generated at the point of the lapse of 3000 hours after the start of the test.

On the other hand, in the case of sample number 60, three defective pieces were generated at the point of the lapse of 3000 hours after the start of the test, because of the high Mn content of 0.45 parts by mol with respect to 100 parts by mol of Ti.

In contrast, it has been determined that the sample numbers 58, 59 can ensure further favorable reliability, without any defective piece generated at all at the point of the lapse of 3000 hours after the start of the test, because the Mn content is 0.01 to 0.30 parts by mol with respect to 100 parts by mol of Ti.

In addition, in the case of sample number 61, because of no V contained, one defective piece was generated at the point of the lapse of 3000 hours after the start of the test.

On the other hand, in the case of sample number 64, three defective pieces were generated at the point of the lapse of 3000 hours after the start of the test, because of the high V content of 0.45 parts by mol with respect to 100 parts by mol of Ti.

In contrast, it has been determined that the sample numbers 62, 63 can ensure further favorable reliability, without any defective piece generated at all even at the point of the lapse of 3000 hours after the start of the test, because the V content is 0.01 to 0.30 parts by mol with respect to 100 parts by mol of Ti.

In addition, in the case of sample number 65, two defective pieces were generated at the point of the lapse of 3000 hours after the start of the test, because of the low Zr content of 0.10 parts by mol with respect to 100 parts by mol of Ti.

In addition, in the case of sample number 68, four defective pieces were generated at the point of the lapse of 3000 hours after the start of the test, because of the high Zr content of 0.90 parts by mol with respect to 100 parts by mol of Ti.

In contrast, it has been determined that the sample numbers 66, 67 can ensure further favorable reliability, without any defective piece generated at all even at the point of the lapse of 3000 hours after the start of the test, because the Zr content is 0.20 to 0.80 parts by mol with respect to 100 parts by mol of Ti.

From the foregoing, it has been determined that while adequate reliability can be ensured as long as the Al—Si based oxide is present at 30% or more in number ratio in the electrode defects, desired reliability can be ensured also by containing the rare-earth element Re, Mg, Mn, V, and Zr, if necessary, in addition to Al and Si as accessory constituents, and reliability can be further improved by further containing Al, Si, the rare-earth element Re, Mg, Mn, V, and Zr respectively in the ranges of 0.10 to 0.30 parts by mol, 1.60 to 4.00 parts by mol, 0.95 to 2.0 parts by mol, 0.10 to 2.00 parts by mol, 0.01 to 0.30 parts by mol, 0.01 to 0.30 parts by mol, and 0.20 to 0.80 parts by mol with respect to 100 parts by mol of Ti.

A multilayer ceramic capacitor which has high reliability with a favorable moisture load life can be achieved even when a high electric field is applied continuously for a long period of time in hot and humid conditions, with dielectric layers and internal electrode layers reduced in thickness and increased in number.

DESCRIPTION OF REFERENCE SYMBOLS

1 ceramic sintered body (laminated body)
2a to 2f internal electrode layer
6a to 6g dielectric layer
7 electrode defect

The invention claimed is:
1. A multilayer ceramic capacitor comprising:
a laminated body having alternately laminated dielectric layers and internal electrode layers,
wherein the dielectric layers contain, as their main constituent, a barium titanate based compound that has a perovskite-type crystal structure,
the internal electrode layers are 0.6 μm or less in thickness, and
a number of the electrode defects containing an Al—Si based oxide mainly containing Al and Si is 30% or more in number ratio to a total number of electrode defects in the internal electrode layers.

2. The multilayer ceramic capacitor according to claim 1, wherein the laminated body contains Al and Si, and with respect to 100 parts by mol of Ti, the Al content is 0.10 parts by mol to 0.30 parts by mol and the Si content is 1.6 parts by mol to 4.0 parts by mol.

3. The multilayer ceramic capacitor according to claim 2, wherein the laminated body contains Mg, Mn, V, Zr, and a rare-earth element Re, and with respect to the 100 parts by mol of the Ti:
the Mg is 0.10 parts by mol to 2.0 parts by mol,
the Mn is 0.01 parts by mol to 0.30 parts by mol,
the V is 0.01 parts by mol to 0.30 parts by mol,
the Zr is 0.20 parts by mol to 0.80 parts by mol, and
the rare-earth element Re is 0.95 parts by mol to 2.0 parts by mol.

4. The multilayer ceramic capacitor according to claim 2, wherein the laminated body contains a rare-earth element Re, and with respect to the 100 parts by mol of the Ti, the rare-earth element Re is 0.95 parts by mol to 2.0 parts by mol.

5. The multilayer ceramic capacitor according to claim 1, wherein the laminated body contains Mg, Mn, V, Zr, and a rare-earth element Re, and with respect to 100 parts by mol of Ti:
the Mg is 0.10 parts by mol to 2.0 parts by mol,
the Mn is 0.01 parts by mol to 0.30 parts by mol,
the V is 0.01 parts by mol to 0.30 parts by mol,
the Zr is 0.20 parts by mol to 0.80 parts by mol, and
the rare-earth element Re is 0.95 parts by mol to 2.0 parts by mol.

6. The multilayer ceramic capacitor according to claim 1, wherein the laminated body contains a rare-earth element Re, and with respect to 100 parts by mol of Ti, the rare-earth element Re is 0.95 parts by mol to 2.0 parts by mol.

7. The multilayer ceramic capacitor according to claim 1, wherein the laminated body contains Al and Si, and when the laminated body is dissolved by a dissolution treatment, with respect to 100 parts by mol of Ti, the Al content is 0.10 parts by mol to 0.30 parts by mol and the Si content is 1.6 parts by mol to 4.0 parts by mol.

8. The multilayer ceramic capacitor according to claim 7, wherein the laminated body contains Mg, Mn, V, Zr, and a rare-earth element Re, and when the laminated body is dissolved by the dissolution treatment, with respect to the 100 parts by mol of the Ti:
the Mg is 0.10 parts by mol to 2.0 parts by mol,
the Mn is 0.01 parts by mol to 0.30 parts by mol,
the V is 0.01 parts by mol to 0.30 parts by mol,
the Zr is 0.20 parts by mol to 0.80 parts by mol, and
the rare-earth element Re is 0.95 parts by mol to 2.0 parts by mol.

9. The multilayer ceramic capacitor according to claim 7, wherein the laminated body contains a rare-earth element Re, and when the laminated body is dissolved by the dissolution treatment, with respect to the 100 parts by mol of the Ti, the rare-earth element Re is 0.95 parts by mol to 2.0 parts by mol.

10. The multilayer ceramic capacitor according to claim 1, wherein the laminated body contains Mg, Mn, V, Zr, and a rare-earth element Re, and when the laminated body is dissolved by a dissolution treatment, with respect to 100 parts by mol of Ti:
the Mg is 0.10 parts by mol to 2.0 parts by mol,
the Mn is 0.01 parts by mol to 0.30 parts by mol,
the V is 0.01 parts by mol to 0.30 parts by mol,
the Zr is 0.20 parts by mol to 0.80 parts by mol, and
the rare-earth element Re is 0.95 parts by mol to 2.0 parts by mol.

11. The multilayer ceramic capacitor according to claim 1, wherein the laminated body contains a rare-earth element Re, and when the laminated body is dissolved by a dissolution treatment, with respect to 100 parts by mol of Ti, the rare-earth element Re is 0.95 parts by mol to 2.0 parts by mol.

* * * * *